United States Patent [19]

Keske

[11] 4,145,522

[45] Mar. 20, 1979

[54] POLYIMIDE FROM AMINO SUBSTITUTED 4-T-BUTYLPHTHALIC ANHYDRIDE

[75] Inventor: Robert G. Keske, Naperville, Ill.

[73] Assignee: Standard Oil Company (Indiana), Chicago, Ill.

[21] Appl. No.: 831,593

[22] Filed: Sep. 8, 1977

Related U.S. Application Data

[62] Division of Ser. No. 700,583, Jun. 28, 1976, Pat. No. 4,078,142.

[51] Int. Cl.$^2$ ............................................. C08G 69/12
[52] U.S. Cl. .............................. 528/331; 260/30.4 N; 528/310
[58] Field of Search .......................... 260/78 A, 78 R; 528/331, 310

[56] References Cited

U.S. PATENT DOCUMENTS 3,450,678  6/1969  Rogers ............................. 260/78 A

*Primary Examiner*—Harold D. Anderson
*Attorney, Agent, or Firm*—Gregory E. Croft; Arthur G. Gilkes; William T. McClain

[57] ABSTRACT

Novel amino-substituted derivatives of 4-t-butylphthalic anhydride are used as monomers to produce novel polyimides with improved solubility characteristics. Increased solubility in organic solvents permits these polyimides to be used in coating applications where structurally similar polyimides could not otherwise be used.

3 Claims, No Drawings

POLYIMIDE FROM AMINO SUBSTITUTED 4-T-BUTYLPHTHALIC ANHYDRIDE

This is a division of application Ser. No. 700,583, filed June 28, 1976, now U.S. Pat. No. 4,078,142.

BACKGROUND OF THE INVENTION

1. Field of the Invention

This invention relates to polyimides and the monomers used in their formation. More particularly, it relates to monomers which impart increased solubility to the polyimides produced therefrom.

2. Description of the Prior Art

A basic problem with many polyimides is their low solubility in most solvents. This limitation prevents their use in many coating applications where it is necessary to dissolve the polymer in a solvent in order to apply it to the surface to be coated. In addition, these polymers are generally high melting, intractible solids which are difficult to mold or process.

U.S. Pat. No. 3,450,678 describes a number of polyimides, including those derived from 4-aminophthalic anhydride, which also suffer from the aforementioned problems. However, it has been discovered that these detrimental properties can be overcome by incorporating a t-butyl group onto the aromatic ring of the monomer. It is believed that the presence of the t-butyl group lowers the crystallinity of the polyimide and correspondingly imparts better solubility and moldability. These new monomers, most specifically including 4-amino-5-t-butylphthalic anhydride, monomethyl 3-amino-5-t-butylphthalate, and dimethyl 4-amino-5-t-butylphthalate, can be polymerized in various proportions to produce improved homopolymers and copolymers with a range of improved properties, depending upon the amount of the monomer incorporated into the polyimide.

Accordingly, it is an object of this invention to produce new monomers which impart improved solubility to the corresponding polyimide.

It is a further object of this invention to produce new polyimides.

These and other objects will become clear upon further reading of the specification.

SUMMARY OF THE INVENTION

In one aspect, the invention resides in an amino-substituted ester of 4-t-butylphthalic anhydride having the general formula

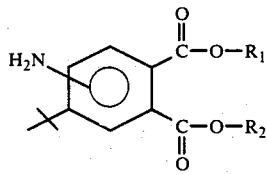

wherein $R_1$ and $R_2$ are individually selected from the group consisting of hydrogen, alkyl groups, and aryl groups, such as methyl, ethyl, isopropyl, n-propyl, t-butyl, phenyl, biphenyl, or naphthyl groups. These esters are useful as monomers in the production of thermally stable polyimides with improved solubility characteristics. These amino-substituted esters are produced by the method comprising (a) nitration of 4-t-butylphthalic anhydride with nitric acid in sulfuric acid; (b) separation of the resulting acid-water phase from the residue; (c) purification of the residue; (d) esterification of the residue to produce the nitro-substituted alkyl ester; and (e) hydrogenation of the nitro-substituted alkyl ester to produce the amino-substituted alkyl ester.

In a further aspect, the invention resides in a thermally stable polyimide having at least a portion, but including 100 percent, of a recurring structural unit of the formula

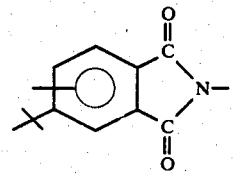

said recurring structural unit imparting improved solubility characteristics to the polyimide into which it is incorporated.

More specifically, the invention resides in a polyimide copolymer comprising first and second recurring structural units, said first unit having the formula

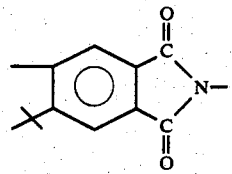

and said second unit having the formula

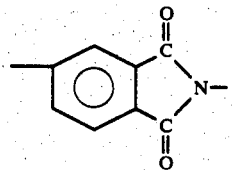

wherein said first recurring structural units are present in amounts from 1 to 99 weight percent and said second recurring structural units are correspondingly present in amounts from 99 to 1 weight percent.

In addition, the invention resides in a thermally stable polyimide homopolymer consisting essentially of the repeating unit having the following formula

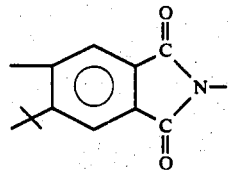

said polyimide exhibiting improved solubility characteristics.

DESCRIPTION OF SPECIFIC EMBODIMENTS

EXAMPLE I

Preparation of dimethyl 4-amino-5-t-butylphthalate

A mixture of 70 g. of 4-t-butylphthalic anhydride and 65 ml. of concentrated sulfuric acid was stirred at room temperature while adding 60 ml. of 90% nitric acid. The rate of addition was slow and controlled such that the temperature of the mixture did not go above 60° C., although the nitration reaction can be carried out at any temperature within the range of −20° to 120° C. After the addition was complete (2 hours) an additional 50 ml. of concentrated nitric acid was added over a 20 minute period. The reaction mixture was allowed to cool and was then stirred for 4 days. The mixture was then poured onto 800 g. of ice and the layers allowed to separate. The upper layer (water and acid) was decanted off and the residue dissolved in 500 ml. of ether. The ether solution was washed five times with 100 ml. of water, dried with MgSO₄, filtered, and the ether removed under reduced pressure. The residual oil was esterified with 150 ml. of trimethyl orthoacetate by mixing the two and distilling off methanol, methyl acetate, and the excess reagent. The crude product was mixed with 400 ml. of methanol and cooled to −10° C. for 20 hours. Filtering and drying gave 33.2 g. of crystalline material. Recrystallization from methanol (125 ml.) gave 30.1 g. of pure dimethyl 4-nitro-5-t-butylphthalate, m.p. 80°–81° C.

Dimethyl 4-nitro-5-t-butylphthalate (42 g.) was mixed with 0.2 g. of 5% Pd/C and, while kept under argon, 200 ml. of methanol was added. Rapid stirring under 30 psi of hydrogen gave complete reduction after 20 hours at 35° C. The mixture was filtered through Celite, and the methanol removed under reduced pressure. The residue was dissolved in 250 ml. of hot benzene, filtered, and mixed with 500 ml. of hexane. After standing 3 hours at room temperature and 16 hours at −10° C., the crystalline product was filtered off. After drying, 35.8 g. (95%) of solid dimethyl 4-amino-5-t-butylphthalate remained, m.p. 120°–122° C.

EXAMPLE II

Preparation of monomethyl 3-amino-5-t-butylphthalate

The initial procedure is the same as that used in Example I, i.e., a mixture of 70 g. of t-butylphthalic anhydride and 65 ml. of concentrated sulfuric acid was stirred at room temperature while adding 60 ml. of 90% nitric acid. The rate of addition was slow and controlled such that the temperature of the mixture did not go above 60° C. After the addition was complete (2 hours) an additional 50 ml. of concentrated nitric acid was added over a 20 minute period. The reaction mixture was allowed to cool and was then stirred for 4 days. The mixture was then poured onto 800 g. of ice and the layers allowed to separate. The upper layer (water and acid) was decanted off and the residue dissolved in 500 ml. of ether. The ether solution was washed five times with 100 ml. of water, dried with MgSO₄, filtered, and the ether removed under reduced pressure. The residual oil was esterified with 150 ml. of trimethyl orthoacetate by mixing the two and distilling off methanol, methyl acetate, and the excess reagent. The esterified product was then further distilled under vacuum to remove the heavy tars.

The crude product was mixed with 400 ml. of methanol and cooled to −10° C. for 20 hours. Filtering and drying gave 33.2 g. of crystalline material. The mother liquors from the recrystallizations were combined and stripped to leave 64 g. of an oil which consisted of Celite, mixture of products. This procedure was repeated until 450 g. of 1. was obtained. −3150.5°−

The 450 g. of oil containing the mixture of nitro-compounds was hydrogenated in 4 parts using 1 g. of 5% Pd/C as catalyst and 250 ml. of methanol as solvent. The mixtures were stirred for 24 hours under 35 psi of hydrogen, filtered through Clite, and the solvent stripped off. The combined oils were mixed with 1 l. of benzene and cooled to -10° C. for 16 hrs. The black solution was filtered to give 61 g. of dark crystalline product. Recrystallization from ethyl acetate gave 55 g. of monomethyl 3;1 -amino-5-t-butylphthalate in crystalline form, m.p. 150.5–152.5° C.

EXAMPLE III

Preparation of homopolymer using no solvent or catalyst

Into a 500 ml. round bottom flask was placed 80 g. of dimethyl 4-amino-5-t-butylphthalate. While a slow stream of argon was passed through the flask, it was immersed in an oil bath at 250° C. The argon inlet was lowered into the molten monomer and the temperature raised to 300° C. over a period of 1 hour. After 3 hours at this temperature, a partial vacuum (80 mm. Hg) was drawn on the system. The temperature was then raised to 330° C. over a period of 3 hours. The solidified product was cooled and ground to give 56.7 g. of yellow polymer, Mn = 970 by VPO. The molecular weight can be increased 2-3 fold by heating at 350°–400° C. under vacuum.

EXAMPLE IV

Preparation of homopolymer using solvent and catalyst 10 g. of dimethyl 4-amino-5-t-butylphthalate was mixed with 40 ml. of distilled Pyrol 10 (N-cyclohexylpyrrolidone from GAF). To this was added 0.1 g. of boric acid and the mixture heated to reflux in an oil bath at 340° C. for 6 hours while under an argon atmosphere. The solution was allowed to cool and poured into 750 ml. of rapidly stirred methanol. The produce was filtered off, washed with 350 ml. of methanol, and dried under vacuum at 80° C. for 16 hours to give 7.7 g. of product. The product had a number average molecular weight of 2304 and an inherent viscosity of 0.08 (in THF).

EXAMPLE V

Preparation of copolymer 5 g. of dimethyl 4-amino-5-t-butylphthalate and 5 g. of dimethyl 4-aminophthalate were mixed with 40 ml. of Pyrol 10 and heated to reflux under a nitrogen atmosphere. After 5 hours, the solution was cooled and poured into 600 ml. of rapidly stirred methanol. Filtering, washing with 300 ml. of methanol, and drying gave 6.0 g. of dark polymer. The inherent viscosity was 0.17 (in THF).

These examples are provided only for the specific purpose of illustration and it will be obvious to those skilled in the art that many variations from the specific examples can be made without departing from the scope of the invention. Specifically, whereas Example V illustrates a copolymer having about 50 weight percent of each recurring structural unit, it will be obvious to those skilled in the art that each component can vary in amount from 1 to 99 weight percent, depending upon the properties desired.

I claim:

1. A thermally stable solid polyimide containing at least 1 percent of a structural unit of the formula

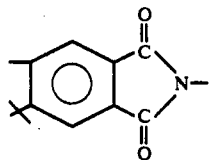

wherein the dangling cross valence extending from the benzene moiety represents the t-butyl substituent.

2. The thermally stable polyimide of claim 1 consisting essentially of repeating units of the formula

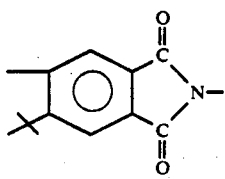

3. The thermally stable polyimide of claim 1 consisting essentially of first and second recurring structural units, said first unit having the following formula wherein the dangling cross valence extending from the benzene moiety represents the t-butyl substituent

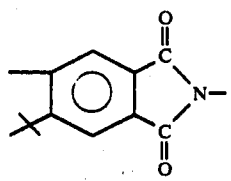

and said second unit having the following formula

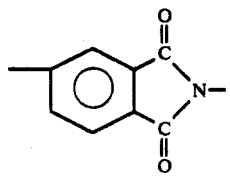

wherein said first recurring structural unit are present in amounts from 1 to 99 weight percent and said second recurring structural units are correspondingly present in amounts from 99 to 1 weight percent.

UNITED STATES PATENT OFFICE
CERTIFICATE OF CORRECTION

Patent No. 4,145,522                 Dated March 20, 1979

Inventor(s) Robert G. Keske

It is certified that error appears in the above-identified patent and that said Letters Patent are hereby corrected as shown below:

| Patent Column | Line | |
|---|---|---|
| 3 | 63 | "Celite, mixture" should be --a mixture-- |
| 3 | 64 | "of 1. was obtained. -3150.5°-" should be --of the oil was obtained.-- |
| 4 | 1 | "Clite" should be --Celite-- |
| 4 | 6 | "monomethyl 3;1 -amino" should be --monomethyl 3-amino-- |
| 6 | 21 | "unit" should be --units-- |

Signed and Sealed this

Twenty-first Day of August 1979

[SEAL]

Attest:

Attesting Officer

LUTRELLE F. PARKER
Acting Commissioner of Patents and Trademarks